(12) United States Patent
Lee (10) Patent No.: US 10,386,643 B2
(45) Date of Patent: Aug. 20, 2019

(54) DISPLAY DEVICE AND METHOD OF DRIVING THE SAME

(71) Applicant: Samsung Display Co., Ltd., Yongin-si, Gyeonggi-do (KR)

(72) Inventor: Jae Sung Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/896,977

(22) Filed: Feb. 14, 2018

(65) Prior Publication Data

US 2019/0033593 A1 Jan. 31, 2019

(30) Foreign Application Priority Data

Jul. 28, 2017 (KR) .......................... 10-2017-0096144

(51) Int. Cl.
| | |
|---|---|
| *G06F 1/16* | (2006.01) |
| *G06F 3/01* | (2006.01) |
| *G09G 3/36* | (2006.01) |
| *G09G 3/30* | (2006.01) |
| *G02B 27/01* | (2006.01) |
| *G02B 27/22* | (2018.01) |

(Continued)

(52) U.S. Cl.
CPC ......... *G02B 27/0172* (2013.01); *G02B 27/22* (2013.01); *G09G 3/003* (2013.01); *G09G 3/30* (2013.01); *G09G 3/3208* (2013.01); *G02B 2027/0118* (2013.01); *G09G 2310/0264* (2013.01); *G09G 2360/12* (2013.01); *G09G 2360/18* (2013.01)

(58) Field of Classification Search
CPC ............... G09G 2340/0407–2340/0435; G09G 2320/00–2320/106; G09G 2320/0285
See application file for complete search history.

(56) References Cited

U.S. PATENT DOCUMENTS

| | | |
|---|---|---|
| 7,526,194 B2 | 4/2009 | Kim |
| 7,746,505 B2 | 6/2010 | Lim |
| 8,638,359 B2 | 1/2014 | Kim et al. |

(Continued)

FOREIGN PATENT DOCUMENTS

| | | |
|---|---|---|
| KR | 10-0542365 | 1/2006 |
| KR | 10-0677332 | 2/2007 |

(Continued)

*Primary Examiner* — Sanghyuk Park
(74) *Attorney, Agent, or Firm* — Lewis Roca Rothgerber Christie LLP (57) ABSTRACT

A display device including a display unit including a plurality of pixels to display images, a display driving unit configured to supply data to the display unit for displaying an image corresponding to a first mode or to a second mode that is different from the first mode, a first memory configured to store, in the first mode, a first correction factor for correcting data corresponding to the image based on a first unit compensation area, and to transmit the first correction factor to the display driving unit, and a second memory configured to store, in the second mode, a second correction factor for correcting data corresponding to the image based on a second unit compensation area, and to transmit the second correction factor to the display driving unit, wherein a size of the first unit compensation area is less than a size of the second unit compensation area.

15 Claims, 8 Drawing Sheets

(51) Int. Cl.
*G09G 3/00* (2006.01)
*G09G 3/3208* (2016.01)

(56) References Cited

U.S. PATENT DOCUMENTS

| | | | | |
|---|---|---|---|---|
| 2006/0061593 A1* | 3/2006 | Miura | ............... | G09G 3/22 |
| | | | | 345/612 |
| 2008/0252666 A1* | 10/2008 | Chen | ............... | G09G 3/2044 |
| | | | | 345/690 |
| 2015/0213771 A1* | 7/2015 | Ohnishi | ............... | G01J 3/46 |
| | | | | 345/88 |
| 2016/0066295 A1* | 3/2016 | Han | ............... | G06F 3/013 |
| | | | | 345/8 |

FOREIGN PATENT DOCUMENTS

| | | |
|---|---|---|
| KR | 10-1670923 | 11/2016 |
| KR | 10-1675852 | 11/2016 |
| KR | 10-2017-0040419 | 4/2017 |

* cited by examiner

DISPLAY DEVICE AND METHOD OF DRIVING THE SAME

CROSS-REFERENCE TO RELATED APPLICATION

The present application claims priority to, and the benefit of, Korean patent application number 10-2017-0096144 filed on Jul. 28, 2017, the entire disclosure of which is incorporated herein in its entirety by reference.

BACKGROUND

Field

Various embodiments of the present disclosure relate to a display device and a method of driving the same.

Description of Related Art

Recently, various electronic devices that may be directly worn on the human body are being developed. Such devices are generally called wearable electronic devices.

A head mounted display device ("HMD"), which is an example of such wearable electronic devices, may display a realistic image to provide a high degree of immersion. The HMD may be used for a variety of purposes (e.g., watching movies).

SUMMARY

Various embodiments of the present disclosure are directed to a display device having improved display quality.

An embodiment of the present disclosure may provide a display device including a display unit including a plurality of pixels to display images, a display driving unit configured to supply data to the display unit for displaying an image corresponding to a first mode or to a second mode that is different from the first mode, a first memory configured to store, in the first mode, a first correction factor for correcting data corresponding to the image based on a first unit compensation area, and to transmit the first correction factor to the display driving unit, and a second memory configured to store, in the second mode, a second correction factor for correcting data corresponding to the image based on a second unit compensation area, and to transmit the second correction factor to the display driving unit, wherein a size of the first unit compensation area is less than a size of the second unit compensation area.

The display device may be driven in the first mode when the display device is mounted to a wearable device, and may be driven in the second mode otherwise.

In the first mode, the display driving unit may be configured to supply, to the display unit, data adjusted by the first correction factor, and, in the second mode, the display driving unit may be configured to supply, to the display unit, data adjusted by the second correction factor.

The display driving unit may include a driving memory configured to receive and store the first correction factor or the second correction factor before the data is supplied to the display unit.

The display driving unit may include a first driving memory configured to receive and store the first correction factor in the first mode, and a second driving memory configured to receive and store the second correction factor in the second mode.

The display device may further include a driving memory located outside the display driving unit, and may be configured to receive and store the first correction factor or the second correction factor before the data is supplied to the display unit.

The display device may further include a first driving memory located outside the display driving unit and configured to receive and store the first correction factor in the first mode, and a second driving memory located outside the display driving unit and configured to receive and store the second correction factor in the second mode.

In the first mode, a first dithering scheme may be used to generate the first correction factor, and, in the second mode, a second dithering scheme that is different from the first dithering scheme may be used to generate the second correction factor.

The first correction factor may be for ensuring that pixels located in the first unit compensation area have substantially the same luminance, and the second correction factor may be for ensuring that pixels located in the second unit compensation area have substantially the same luminance.

A driving frequency of the image displayed on the display unit in the first mode may be greater than a driving frequency of the image displayed on the display unit in the second mode.

An embodiment of the present disclosure may provide a method of driving a display device including a display unit, the method including determining whether the display device is in a first mode or in a second mode that is different from the first mode, generating and storing a first correction factor for correcting data corresponding to an image displayed on the display unit based on a first unit compensation area when the display device is in the first mode, generating and storing a second correction factor for correcting data corresponding to an image displayed on the display unit based on a second unit compensation area when the display device is in the second mode, displaying, on the display unit, an image from which a stain has been removed using the first correction factor when the display device is in the first mode, and displaying, on the display unit, an image from which a stain has been removed using the second correction factor when the display device is in the second mode, wherein a size of the first unit compensation area is less than a size of the second unit compensation area.

The determining may include determining that the display device is in the first mode when the display device is mounted to a wearable device, and determining that the display device is in the second mode otherwise.

A driving frequency of the image displayed on the display unit in the first mode may be greater than a driving frequency of the image displayed on the display unit in the second mode.

The first correction factor may be generated with reference to a luminance of an area of the first unit compensation area other than a stain area included in the first unit compensation area, and the second correction factor may be generated with reference to a luminance of an area of the second unit compensation area other than a stain area included in the second unit compensation area.

The first correction factor may be generated with reference to an average value of luminances of first sampling points located on corners of the first unit compensation area, and the second correction factor may be generated with reference to an average value of luminances of second sampling points located on corners of the second unit compensation area.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1A:
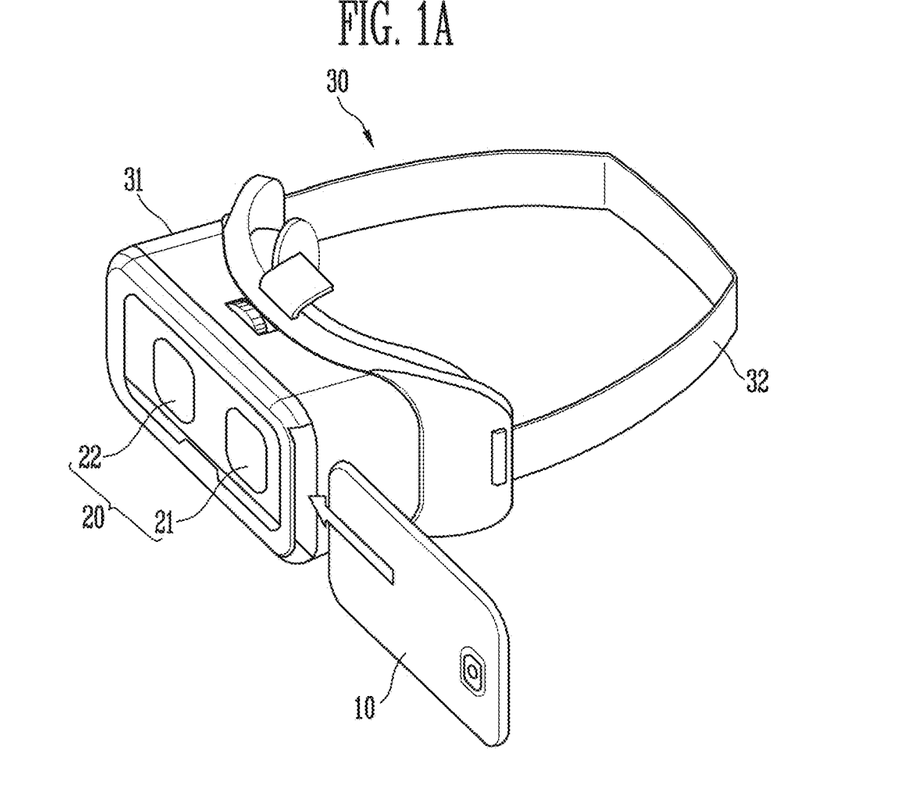
FIGS. 1A to 1B are diagrams illustrating a process of mounting a display device in accordance with an embodiment of the present disclosure to a wearable device.
Figure 1B:
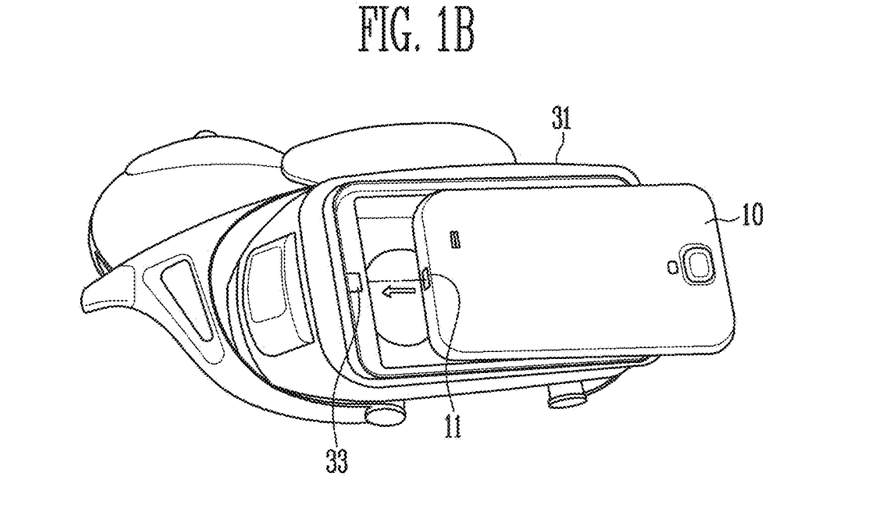

FIGS. 1A and 1B are diagrams illustrating a process of mounting a display device of an embodiment of the present disclosure to a wearable device 30.

Although, in FIGS. 1A and 1B, an HMD is illustrated as an embodiment of the wearable device, the wearable device is not limited thereto.

Referring to FIGS. 1A and 1B, the wearable device 30 in accordance with an embodiment of the present disclosure may include a frame 31.

The frame 31 may be coupled with a band 32. A user may wear the frame 31 on his/her head using the band 32. The frame 31 may have a structure allowing the display device 10 to be removably mounted thereto.

The display device 10, which can be mounted to the wearable device 30, may be a smartphone, but it is not limited thereto. For example, the display device 10 may be not only a smartphone, but may also be any one of electronic devices, such as a tablet PC, an electronic book reader, a computer, a workstation, a personal digital assistant (PDA), a portable multimedia player (PMP), a camera, and a medical digital device, which may be mounted to the wearable device 30 and provided with a display unit.

When the display device 10 is mounted to the frame 31, a connector 11 of the display device 10 may be coupled with a connector 33 of the frame 31 so that the display device 10 may be electrically coupled to the wearable device 30. In other words, the wearable device 30 and the display device 10 may communicate with each other.

To control the display device 10 mounted to the frame 31, the wearable device 30 may include at least one of a touch sensor, a button, and a wheel key.

If the display device 10 is mounted to the wearable device 30, the display device 10 may be operated as an HMD.

For example, in the case where the display device 10 is mounted to the wearable device 30, the display device 10 may be driven in a first mode (e.g., a VR mode). In the case where the display device 10 is removed from the wearable device 30, the display device 10 may be driven in a second mode (e.g., a normal mode).

The driving mode of the display device 10 may be automatically or manually converted. For example, if the display device 10 is mounted to the wearable device 30, the display device 10 may be automatically driven in the first mode, and if the display device 10 is removed from the wearable device 30, the driving mode of the display device 10 may be automatically converted from the first mode to the second mode. Conversely, the display device 10 may be operated in the first mode or the second mode according to a manipulation of the user.

The wearable device 30 may include lenses 20 corresponding to the two eyes of the user. For example, the wearable device 30 may include a left lens 21 and a right lens 22 that respectively correspond to the left and right eyes of the user.

Alternatively, the wearable device 30 may include an integrated lens to allow the user to simultaneously see the same image with his/her left and right eyes.

The lens 20 may instead be, in other embodiments, a fish-eye lens or a wide-angle lens so as to increase a field of view (FOV) of the user, but it is not limited thereto.

If the display device 10 is fixed to the frame 31, the user may watch, through the lens 20, an image displayed on the display device 10. Hence, this may have the same effect as if the user watches a large screen spaced farther from him/her (e.g., spaced by a predetermined distance).

In FIGS. 1A and 1B, there is illustrated the case where the display device 10 is removably mounted to the wearable device 30, but the present disclosure is not limited to this. For example, the display device 10 may be fixed to the wearable device 30 without being removable from the wearable device 30.

As shown in the present embodiment, if the display device 10 is used with the wearable device 30, the user may enjoy various types of images.

However, when the display device 10 is driven in the first mode, the distance between the display device 10 and the eyes of the user is relatively short, and an image displayed on the display device 10 is enlarged by the lens 20. Therefore, a stain that is invisible to the user when the display device 10 is driven in the second mode may be visible to the user when the display device 10 is driven in the first mode.

Therefore, the following embodiments of the present disclosure propose a display device which may reduce, prevent, or minimize a stain from being markedly visible to a user when the display device 10 is driven in the first mode, and a method of driving the display device.

Figure 2:
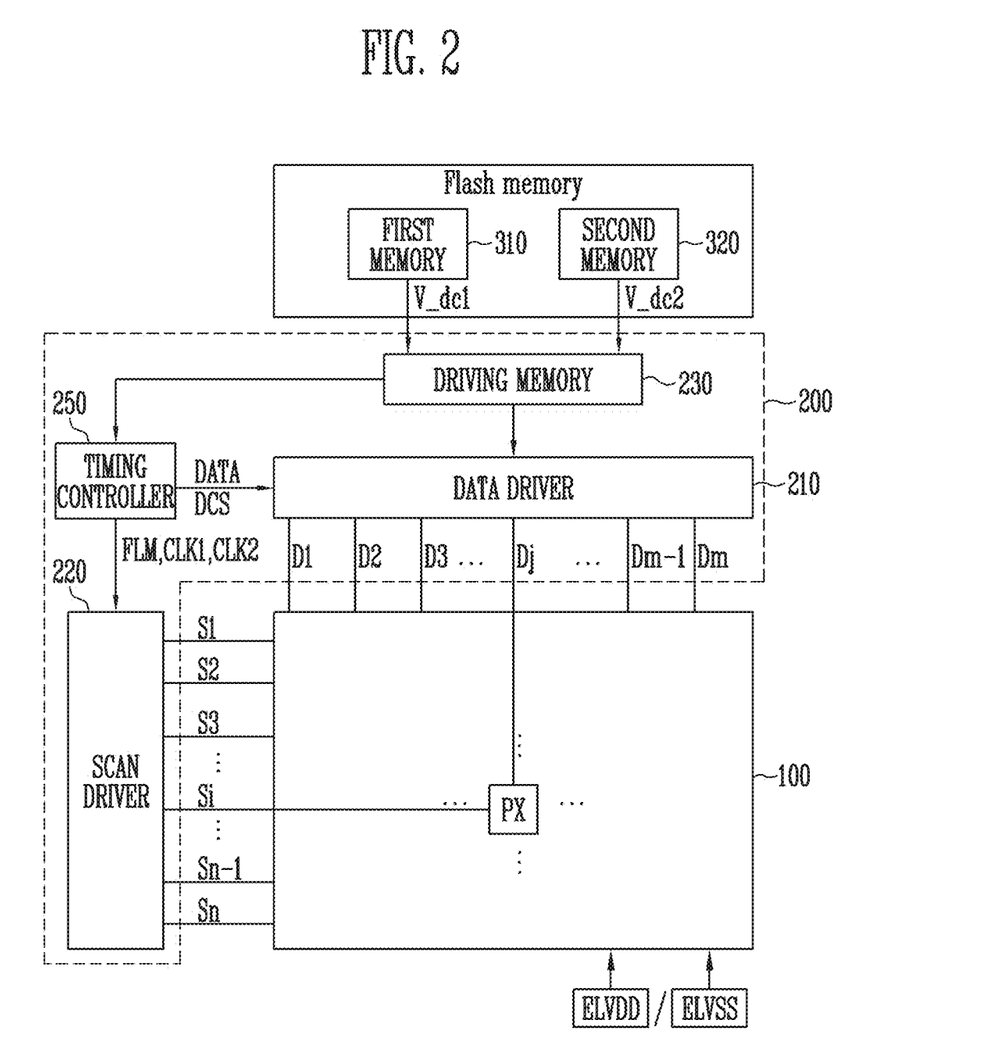
FIG. 2 is a diagram illustrating the configuration of a display device in accordance with an embodiment of the present disclosure.

FIG. 2 is a diagram illustrating the configuration of a display device 10 in accordance with an embodiment of the present disclosure.

Referring to FIG. 2, the display device 10 according to the present disclosure may include a display unit 100, a display driving unit 200, and a memory 310, 320.

The display unit 100 may include a plurality of pixels PX to display an image. At least one of scan lines S1 to Sn and at least one of data lines D1 to Dm may be coupled to each pixel PX. In addition, each pixel PX may include an organic light-emitting diode.

The display driving unit 200 may include a data driver 210, a scan driver 220, a driving memory 230, and a timing controller 250.

The pixels PX may be supplied with data signals from the data lines D1 to Dm when scan signals are supplied from the scan lines S1 to Sn to the pixels PX. The pixels PX may include at least one of a red pixel, a green pixel, a white pixel, and a blue pixel.

Each of the pixels PX that have been supplied with the data signals may control the amount of current flowing from a first power source ELVDD to a second power source ELVSS via the organic light-emitting diode. The organic light-emitting diode may generate light having a luminance corresponding to the amount of current.

The scan driver 220 may supply scan signals to the scan lines S1 to Sn in response to scan driver control signals FLM, CLK1, and CLK2 supplied from the timing controller 250.

The scan driver 220 may successively supply scan signals to the scan lines S1 to Sn. When the scan signals are successively supplied, the pixels PX may be successively selected on a horizontal line basis.

In other embodiments, the display device 10 may further include emission control lines coupled to the pixels PX, and the scan driver 220 may supply emission control signals to the emission control lines. Alternatively, the display device 10 may further include an emission driver configured to supply emission control signals to the emission control lines.

The data driver 210 may supply data signals to the data lines D1 to Dm in response to a data control signal DCS supplied from the timing controller 250. The data signals supplied to the data lines D1 to Dm may be supplied to pixels PX selected by the respective scan signals.

The timing controller 250 may supply the data control signal DCS to the data driver 210. The timing controller 250 may translate image data input from an external device into image data DATA corresponding to the specifications of the data driver 210, and then may supply the image data DATA to the data driver 210.

The data control signal DCS may include a source start signal, a source output enable signal, a source sampling clock, etc. The source start signal may control a point in time at which a data sampling operation of the data driver 210 starts. The source sampling clock may control the sampling operation of the data driver 210 based on a rising or falling edge. The source output enable signal may control the output timing of the data driver 210.

The timing controller 250 may supply, to the scan driver 220, the scan driver control signals FLM, CLK1, and CLK2 generated based on timing signals supplied from the external device.

The timing controller 250 may control the data driver 210 and the scan driver 220 such that the data driver 210 and the scan driver 220 can be driven in the first mode or the second mode. For this, the timing controller 250 may supply mode control signals to the data driver 210 and the scan driver 220.

The data driver 210 that has been supplied with a mode control signal corresponding to the first mode may supply a data signal corresponding to the first mode to the display unit 100. The scan driver 220 that has been supplied with a mode control signal corresponding to the first mode may supply a scan signal corresponding to the first mode to the display unit 100.

The data driver 210 that has been supplied with a mode control signal corresponding to the second mode may supply a data signal corresponding to the second mode to the display unit 100. The scan driver 220 that has been supplied with a mode control signal corresponding to the second mode may supply a scan signal corresponding to the second mode to the display unit 100.

Consequently, the display unit 100 may display an image corresponding to the first mode, or may display an image corresponding to the second mode.

In the display device 10, a driving frequency of the image in the first mode may be greater than a driving frequency of the image in the second mode. For example, the driving frequency of the image in the first mode may be 75 Hz, which means that the image is displayed 75 times per second. In addition, the driving frequency of the image in the second mode may be 60 Hz, which mean that the image is displayed 60 times per second. However, it should be noted that the first and second modes may operate with different driving frequencies in other embodiments.

The memory 310, 320 according to an embodiment of the present disclosure may include a first memory 310 and a second memory 320.

In the first mode, the first memory 310 may store a first correction factor V_dc1 suitable for correcting a stain displayed on the display unit 100 based on a first unit compensation area, and may transmit the first correction factor V_dc1 to the data driver 210.

In the second mode, the second memory 320 may store a second correction factor V_dc2 suitable for correcting a stain displayed on the display unit 100 based on a second unit compensation area, and may transmit the second correction factor V_dc2 to the data driver 210.

Each memory 310, 320 may include a nonvolatile memory device, such as an erasable programmable read-only memory (EPROM), an electrically erasable programmable read-only memory (EEPROM), a flash memory, a phase change random access memory (PRAM), a ferroelectric random access memory (FRAM), a resistive random access memory (RRAM) and a magnetic random access memory (MRAM).

The display driving unit 200 may include the driving memory 230 configured to receive and store the first correction factor V_dc1 or the second correction factor V_dc2 from the first memory 310 or the second memory 320 before a data signal is supplied to the display unit 100.

In the first mode, the driving memory 230 may transmit data or the first correction factor V_dc1 corresponding to the first mode to the timing controller 250 or the data driver 210.

In the second mode, the driving memory 230 may transmit data or the second correction factor V_dc2 corresponding to the second mode to the timing controller 250 or the data driver 210.

In FIG. 2, there is illustrated an example in which the driving memory 230 is separately provided, but the present disclosure is not limited to this. For example, the driving memory 230 may be included in the data driver 210 or the timing controller 250.

In FIG. 2, there is illustrated the case where the first memory 310 is integrated with the second memory 320 (e.g., in a flash memory), but the present disclosure is not limited to this. As may be suitable, in other embodiments, the first memory 310 and the second memory 320 may be provided separately from each other.

In FIG. 2, there is illustrated the case where each of the pixels PX are coupled to a single respective scan line, but the present disclosure is not limited to this. For instance, a plurality of scan lines may be coupled to each of the pixels PX depending on the structure of a pixel circuit included in the pixel PX.

In FIG. 2, there is illustrated an example in which the data driver 210, the scan driver 220, the driving memory 230, and the timing controller 250 are separately provided, but at least some of the foregoing components may be integrated with each other, as may be suitable, in other embodiments.

The data driver 210, the scan driver 220, the driving memory 230, and the timing controller 250 may be installed using any one of various forms (e.g., a chip-on-glass form, a chip-on-plastic form, a tape carrier package form, and a chip-on-film form).

Figure 3A:
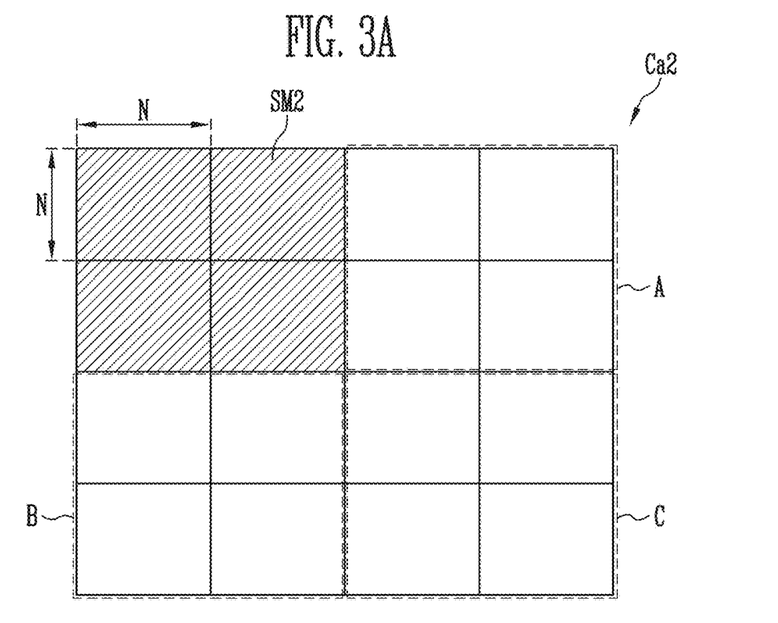
FIGS. 3A and 3B are views illustrating a method of compensating for a stain in accordance with an embodiment of the present disclosure.
Figure 3B:
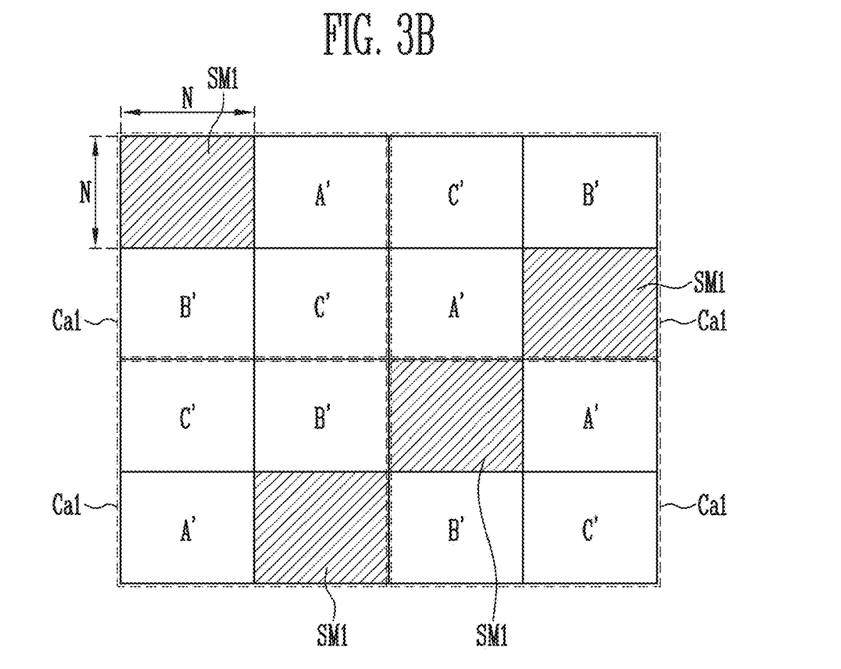

FIGS. 3A and 3B are views illustrating a method of compensating for a stain in accordance with an embodiment of the present disclosure. In particular, FIG. 3A is a view illustrating a method of compensating for a stain in the second mode, and FIG. 3B is a view illustrating a method of compensating for a stain in the first mode. Only a portion of the display unit 100 is illustrated in FIGS. 3A and 3B. The size of the portion of the display unit 100 shown in FIG. 3A is the same as that of the portion of the display unit 100 shown in FIG. 3B.

Referring to FIG. 3A, a second stain SM2 may be displayed on the display unit 100, and the size of the second stain SM2 may correspond to the size of a 2N×2N pixel area.

In the second mode, based on a second unit compensation area Ca2, a second correction factor V_dc2 may be generated to remove the second stain SM2.

The size of the second unit compensation area Ca2 may correspond to the size of a 4N×4N pixel area (N being a natural number of 2 or more). The second unit compensation area Ca2 may include the second stain SM2, area A and area B, which are respectively located on two sides of the second stain SM2, and area C located diagonally from the second stain SM2.

Each of areas A to C may have the same or similar size as that of the second stain SM2.

The second correction factor V_dc2 for removing the second stain SM2 may be generated with reference to luminances of areas A to C. For instance, the second correction factor V_dc2 may be generated such that the area on which the second stain SM2 is displayed has the same luminance as that of areas A to C. In other words, because of the second correction factor V_dc2, the pixels on the second unit compensation area Ca2 have the same luminance. Consequently, the stain may be removed.

The generated second correction factor V_dc2 may be stored in the second memory 320.

However, when the size of the second stain SM2 is less than that of the 2N×2N pixel area, the second stain SM2 may not be sensed.

A 1×1 pixel area may include a red pixel, a green pixel, and a blue pixel. Alternatively, the 1×1 pixel area may include any one of a red pixel, a green pixel, and a blue pixel.

Referring to FIG. 3B, a first stain SM1 may be displayed on the display unit 100, and the size of the first stain SM1 may be less than that of the second stain SM2. For example, the size of the first stain SM1 may correspond to the size of an N×N pixel area.

In the first mode, based on a first unit compensation area Ca1, a first correction factor V_dc1 may be generated to remove the first stain SM1.

The size of the first unit compensation area Ca1 may be less than that of the second unit compensation area Ca2. For example, the size of the first unit compensation area Ca1 may correspond to the size of a 2N×2N pixel area. The first unit compensation area Ca1 may include the first stain SM1, area A' and area B', which are located on respective sides of the first stain SM1, and area C', which is located in a diagonal direction of the first stain SM1.

Each of areas A' to C' may have the same or similar size as that of the first stain SM1.

The first correction factor V_dc1 for removing the first stain SM1 may be generated with reference to luminances of areas A' to C'. For instance, the first correction factor V_dc1 may be generated such that the area on which the first stain SM1 is displayed has the same luminance as that of areas A' to C'. In other words, because of the first correction factor V_dc1, the pixels PX on the first unit compensation area Ca1 are able to have the same luminance. Consequently, the first stain SM1 may be removed.

The generated first correction factor V_dc1 may be stored in the first memory 310.

In other words, when the display device 10 is driven in the first mode, a correction factor is generated based on a unit compensation area having a comparatively small size. Consequently, even a relatively fine, or small, stain may be removed. When the display device 10 is driven in the second mode, a unit compensation area having a comparatively small size, such as the unit compensation area used in the first mode, is not unnecessarily used in an operation of generating a correction factor for a comparatively larger stain. Therefore, the power consumption may be reduced.

The display device 10 according to an embodiment of the present disclosure may include a separate sensing circuit that is configured to obtain the luminance of a stain displayed on the display unit 100, or to obtain the luminances of areas around the stain, or a camera for capturing images by grayscales. Alternatively, the luminance of the stain or the areas around the stain may be obtained using the data lines D1 to Dm and the data driver 210.

The first correction factor V_dc1 and the second correction factor V_dc2 may be calculated using the separate sensing circuit or the camera, and then may be respectively stored in the first memory 310 and the second memory 320. Alternatively, the first correction factor V_dc1 and the second correction factor V_dc2 may be respectively calculated and stored in the first memory 310 and the second memory 320.

The first correction factor V_dc1 and the second correction factor V_dc2 may be provided to generate a data correction value. In detail, the data driver 210 or the timing controller 250 may generate a data correction value using the first correction factor V_dc1 or the second correction factor V_dc2, and may supply the data correction value to the display unit 100.

In an embodiment of the present disclosure, the luminances of the corresponding stain SM1, SM2 and of the respective areas A to C, A' to C' around the stain SM1, SM2 may be obtained by sensing current flowing in the organic light-emitting diode included in each pixel PX.

Alternatively, the luminances of the stain SM1, SM2 and the areas A to C, A' to C' respectively around the stain SM1, SM2 may be measured by capturing an image. The correction factor V_dc1, V_dc2 may be generated such that there is little or no deviation between the luminances of pixels taken from the camera and a target luminance.

Furthermore, one of an average value, a maximum value, and a minimum value of the luminances of the pixels PX on each area may be determined as a luminance value of the corresponding area.

Figure 4A:
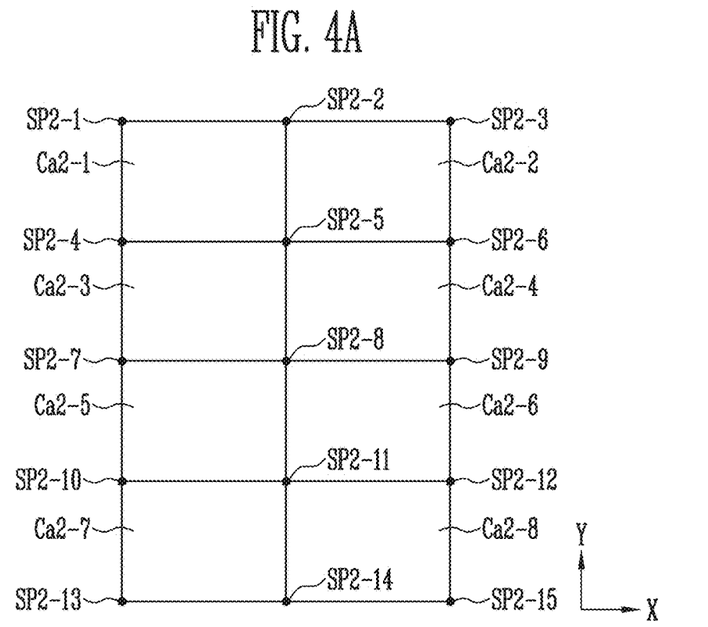
FIGS. 4A and 4B are views illustrating a method of compensating for a stain in accordance with an embodiment of the present disclosure.
Figure 4B:
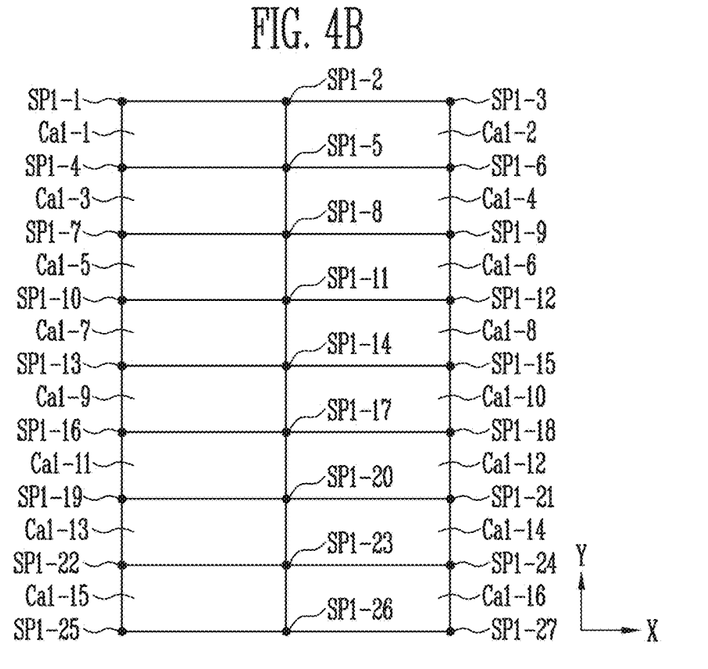

FIGS. 4A and 4B are views illustrating a method of compensating for a stain in accordance with an embodiment of the present disclosure. In particular, FIG. 4A is a view illustrating a method of compensating for a stain in the second mode, and FIG. 4B is a view illustrating a method of compensating for a stain in the first mode. The entirety of an example of the display unit 100 is illustrated in FIGS. 4A and 4B.

Referring to FIG. 4A, in the second mode, the display unit 100 may include second unit compensation areas Ca2-1 to Ca2-8 and second sampling points SP2-1 to SP2-15. For example, the display unit 100 may be divided into eight areas, and the divided areas may correspond to respective ones of the second unit compensation areas Ca2-1 to Ca2-8.

On four corners of each of the second unit compensation areas Ca2-1 to Ca2-8, the corresponding ones of the second sampling points SP2-1 to SP2-15 may be located.

A second correction factor V_dc2 for each of the second unit compensation areas Ca2-1 to Ca2-8 may be generated with reference to an average value of luminances of the corresponding second sampling points SP2-1 to SP2-15 located on the four corners thereof.

For example, a second correction factor V_dc2 may be generated such that the first second-unit compensation area Ca2-1 has the same luminance value as an average value of the luminances of the second sampling points SP2-1, SP2-2, SP2-4 and SP2-5 located on the four corners of the first second-unit compensation area Ca2-1. A second correction factor V_dc2 corresponding to each of the other second unit compensation areas Ca2-2 to Ca2-8 may be generated in a similar manner as described above. The generated second correction factor V_dc2 may be stored in the second memory 320.

In this case, the entirety of the display unit 100 may display an image having a uniform luminance.

Referring to FIG. 4B, in the first mode, the display unit 100 may include first unit compensation areas Cal-1 to Cal-16 and first sampling points SP1-1 to SP1-27.

For example, the display unit 100 may be divided into sixteen areas, and the divided areas may be the respective first unit compensation areas Cal-1 to Cal-16. The size of each of the first unit compensation areas Cal-1 to Cal-16 may be less than the size of each of the second unit compensation areas Ca2-1 to Ca2-8.

On four corners of each of the first unit compensation areas Cal-1 to Cal-16, the corresponding ones of the first sampling points SP1-1 to SP1-27 may be located.

A first correction factor V_dc1 for each of the first unit compensation areas Cal-1 to Cal-16 may be respectively generated with reference to an average value of luminances of the corresponding first sampling points SP1-1 to SP1-27 located on the four corners thereof.

For example, a first correction factor V_dc1 may be generated such that the first first-unit compensation area Cal-1 has the same luminance value as an average value of the luminances of the first sampling points SP1-1, SP1-2, SP1-4 and SP1-5 located on the four corners of the first first-unit compensation area Cal-1. A first correction factor V_dc1 corresponding to each of the other first unit compensation areas Ca1-2 to Ca1-16 may be generated in the same manner as described above.

The generated first correction factor V_dc1 may be stored in the first memory 310.

In this case, the entirety of the display unit 100 may display an image having a uniform luminance.

In particular, when the display device 10 is driven in the first mode, a correction factor may be generated based on a unit compensation area having a comparatively small size. Thus, the luminance of an image displayed in the first mode may be more uniform than that of an image displayed in the second mode.

Each of the sampling points may include a red pixel, a green pixel, and a blue pixel. Alternatively, each of the sampling points may include any one of a red pixel, a green pixel, and a blue pixel.

Figure 5A:
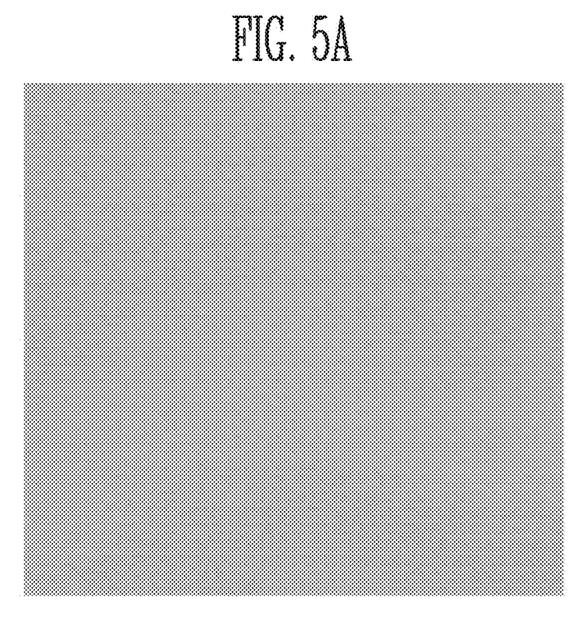
FIGS. 5A and 5B are views illustrating the effect of a method of compensating for a stain in accordance with an embodiment of the present disclosure.
Figure 5B:
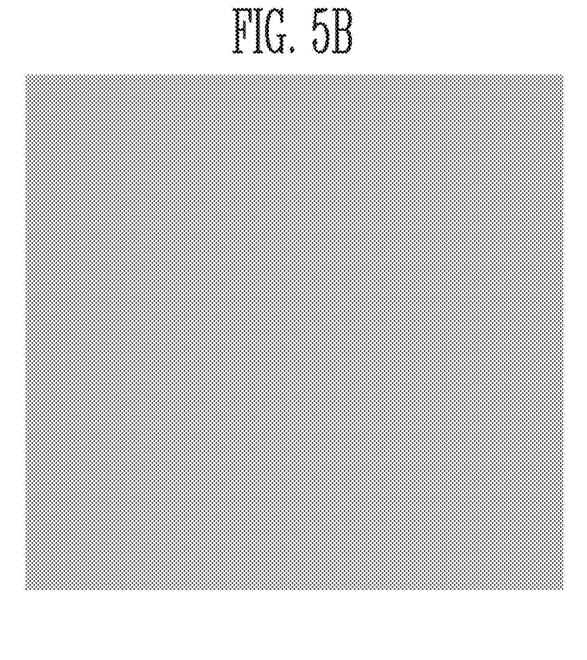

FIGS. 5A and 5B are views illustrating the effect of a method of removing a stain in accordance with an embodiment of the present disclosure.

The display driving unit 200 according to an embodiment of the present disclosure (e.g., the timing controller 250 of the display driving unit 200) may use a data dithering function to generate a correction factor for removing a stain displayed on the display unit 100.

In this case, in the first mode, a first dithering scheme may be applied to data to generate a first correction factor. In the second mode, a second dithering scheme may be applied to data to generate a second correction factor.

When the second dithering scheme is used, data corresponding to an arbitrary real number grayscale between a first grayscale and a second grayscale may be generated, and the distance between the first grayscale and the second grayscale may be divided into $2^i$ segments. Here, i is a natural number, and the difference between the first grayscale and the second grayscale may be a grayscale value "1".

For example, when i is 3 and the first grayscale and the second grayscale respectively have grayscale values "128" and "129", correction factors corresponding to a grayscale value "128.125", a grayscale value "128.25", a grayscale value "128.375", a grayscale value "128.5", a grayscale value "128.625", a grayscale value "128.75", and a grayscale value "128.875" may be generated.

When the first dithering scheme is used, data corresponding to an arbitrary real number grayscale between the first grayscale and the second grayscale may be generated, and the distance between the first grayscale and the second grayscale may be divided into $2^j$ segments. Here, j is a natural number greater than i, and the difference between the first grayscale and the second grayscale may be a grayscale value "1".

For example, when j is 4 and the first grayscale and the second grayscale have grayscale values "128" and "129", correction factors corresponding to a grayscale value "128.0625", a grayscale value "128.125", a grayscale value "128.1875", a grayscale value "128.25", a grayscale value "128.3125", a grayscale value "128.375", a grayscale value "128.4375", a grayscale value "128.5", a grayscale value "128.5625", a grayscale value "128.625", a grayscale value "128.6875", a grayscale value "128.75", a grayscale value "128.8125", a grayscale value "128.875", and a grayscale value "128.9375" may be generated.

When the first dithering scheme is applied to data, the number of generated correction factors may be increased, and a difference in grayscale values between the generated correction factors may be reduced, as compared to those of the case where the second dithering scheme is applied to the data.

FIG. 5A is a view illustrating an example of an image displayed on the display unit 100 when the dithering function is used in the second mode. FIG. 5B is a view illustrating an example of an image displayed on the display unit 100 when the dithering function is used in the first mode.

Referring to FIGS. 5A and 5B, it may be seen that the uniformity of the image is increased when the first dithering scheme is used in the first mode. In other words, the user may watch an image having high quality even when the distance between his/her eyes and the display device 10 is relatively short, or when an image displayed on the display unit 100 is enlarged.

Figure 6:
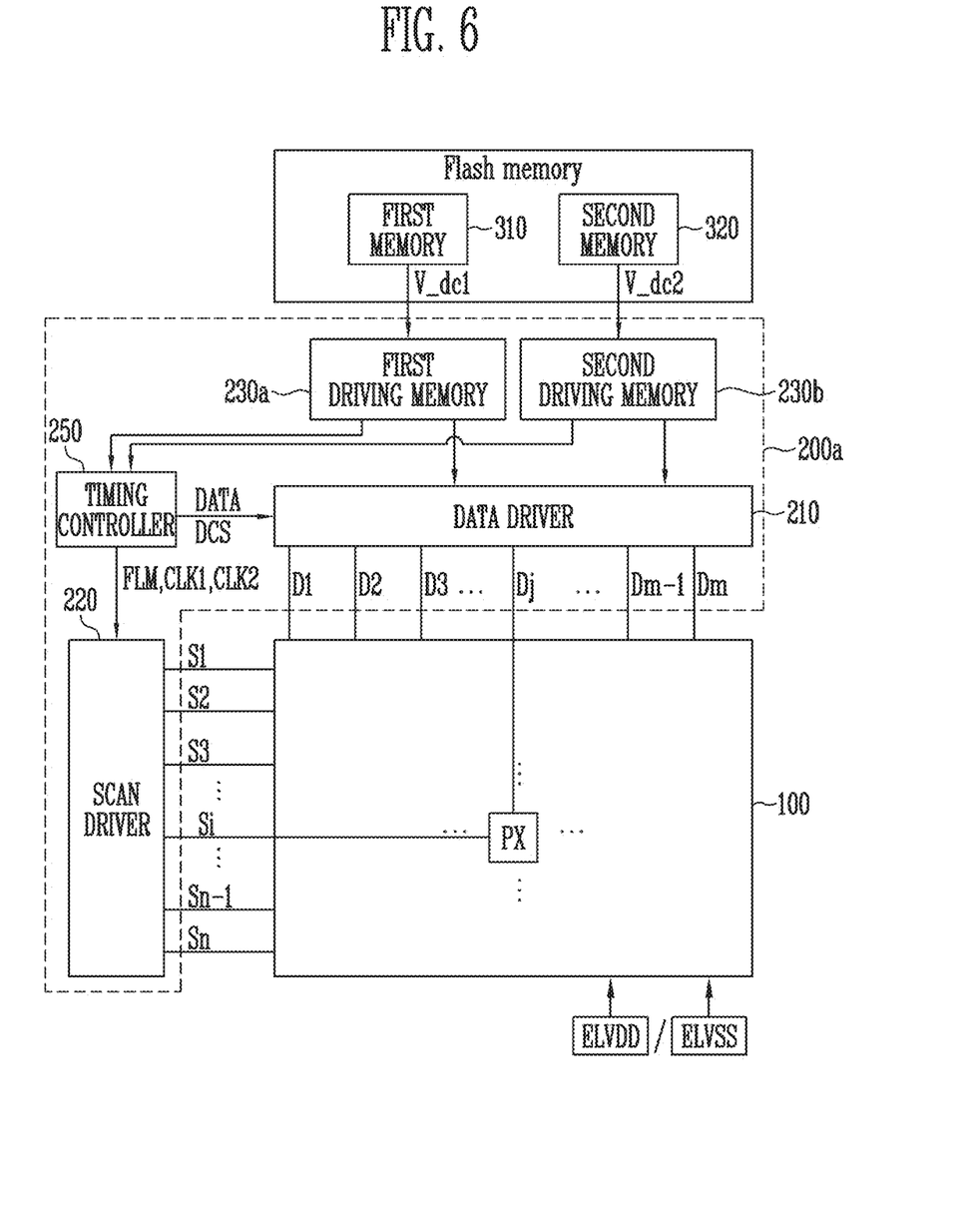
FIGS. 6 to 8 are views illustrating the configuration of a display device in accordance with an embodiment of the present disclosure.
Figure 7:
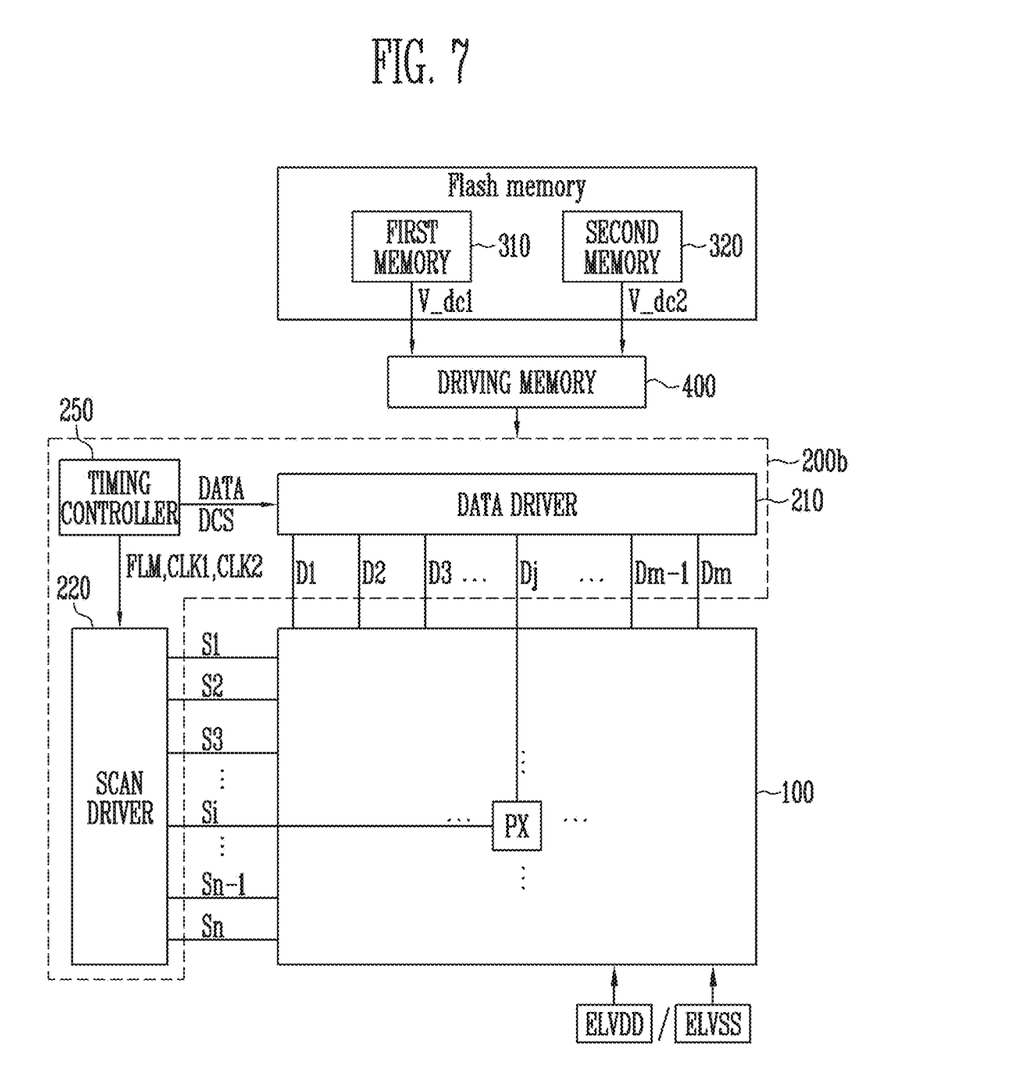
Figure 8:
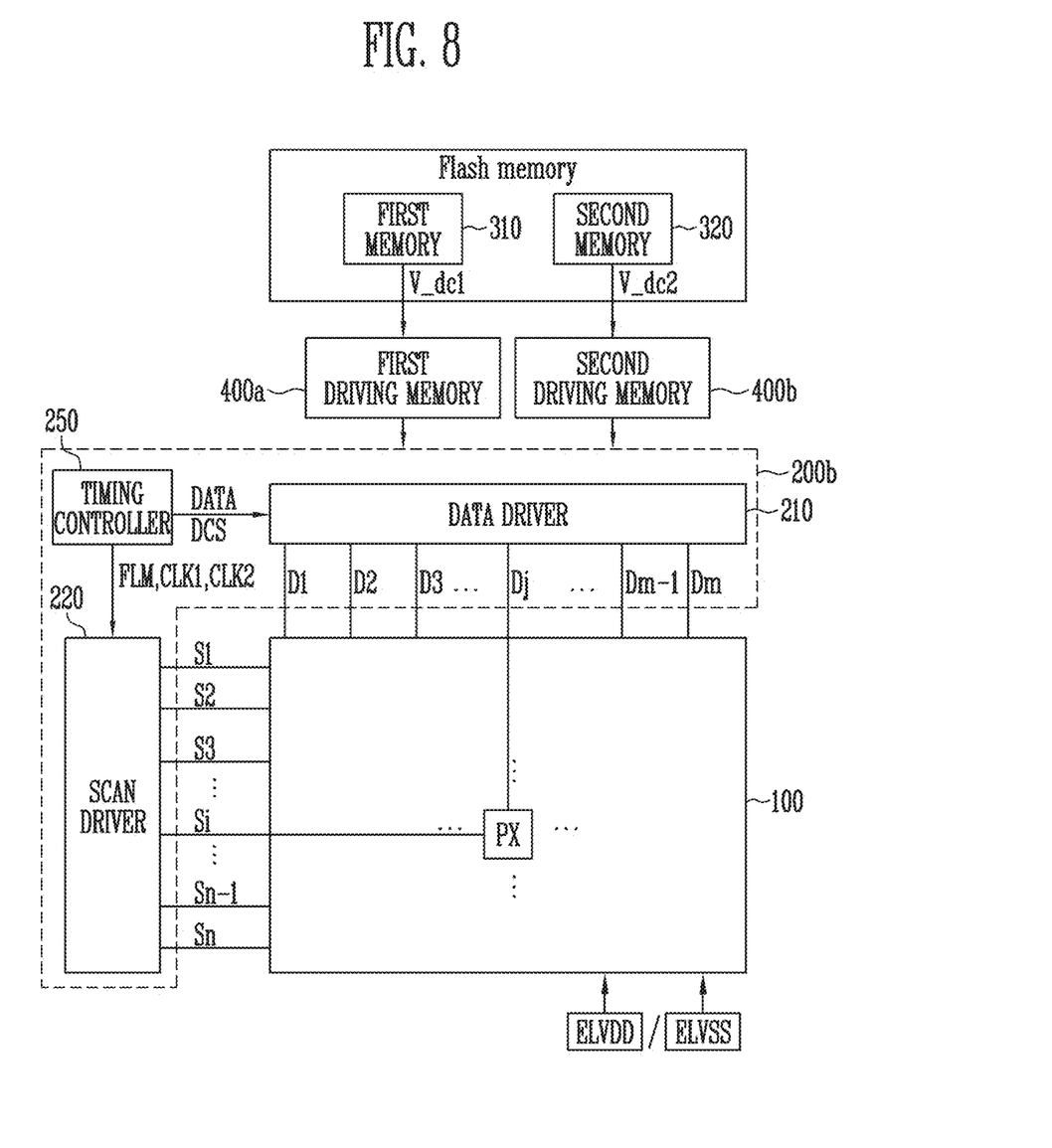

FIGS. 6 to 8 are views illustrating the configuration of a display device 10 in accordance with an embodiment of the present disclosure.

In FIGS. 6 to 8, like reference numerals are used to designate the same or similar elements as those described with reference to FIGS. 1A, 1B and 2, and detailed descriptions thereof will be omitted. Hereinafter, the description will be focused on differences from those described with reference to FIGS. 1A, 1B and 2.

Referring to FIG. 6, a display driving unit 200a may include a first driving memory 230a and a second driving memory 230b.

When the display device 10 is driven in the first mode, a first correction factor V_dc1 supplied from the first memory 310 may be stored in the first driving memory 230a.

When the display device 10 is driven in the second mode, a second correction factor V_dc2 supplied from the second memory 320 may be stored in the second driving memory 230b.

In other words, the first driving memory 230a may be operated in the first mode, and the second driving memory 230b may be operated in the second mode.

In FIG. 6, there is illustrated an example in which the first driving memory 230a and the second driving memory 230b are separately provided, but the present disclosure is not limited to this. For example, the first driving memory 230a and the second driving memory 230b may be included in the data driver 210 or the timing controller 250.

Referring to FIG. 7, the display device 10 according to an embodiment of the present disclosure may include a driving memory 400. The driving memory 400 may be located outside a display driving unit 200b. For example, the driving memory 400 may be provided separately from a chip on which the display driving unit 200b is formed.

Before a data signal is supplied to the display unit 100, the driving memory 400 may receive a first correction factor V_dc1 or a second correction factor V_dc2 from the first memory 310 or the second memory 320, and may store it.

The first correction factor V_dc1 or the second correction factor V_dc2 may be supplied to the data driver 210, or may be supplied to the data driver 210 via the timing controller 250.

In the first mode, only the first correction factor V_dc1 may be supplied to the driving memory 400. In the second mode, only the second correction factor V_dc2 may be supplied to the driving memory 400.

Referring to FIG. 8, the display device 10 according to an embodiment of the present disclosure may include a first driving memory 400a and a second driving memory 400b. The first driving memory 400a and the second driving memory 400b may be located outside the display driving unit 200b. In other words, the first driving memory 400a and the second driving memory 400b may be provided separately from a chip on which the display driving unit 200b is formed.

When the display device 10 is driven in the first mode, a first correction factor V_dc1 supplied from the first memory 310 may be stored in the first driving memory 400a before data is supplied to the display unit 100.

When the display device 10 is driven in the second mode, a second correction factor V_dc2 supplied from the second memory 320 may be stored in the second driving memory 400b before data is supplied to the display unit 100.

In other words, the first driving memory 400a may be operated in the first mode, and the second driving memory 400b may be operated in the second mode.

The first correction factor V_dc1 or the second correction factor V_dc2 may be supplied to the data driver 210, or may be supplied to the data driver 210 via the timing controller 250.

Various embodiments of the present disclosure may provide a display device having improved display quality.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included.

What is claimed is:
1. A display device comprising:
a display unit comprising a plurality of pixels to display images;
a display driving unit configured to supply data to the display unit for displaying an image corresponding to a first mode or to a second mode that is different from the first mode;
a first memory configured to store, in the first mode, a first correction factor for correcting data corresponding to the image based on a first unit compensation area, and to transmit the first correction factor to the display driving unit; and a second memory configured to store, in the second mode, a second correction factor for correcting data corresponding to the image based on a second unit compensation area, and to transmit the second correction factor to the display driving unit, wherein a size of the first unit compensation area is less than a size of the second unit compensation area.

2. The display device according to claim 1, wherein the display device is driven in the first mode when the display device is mounted to a wearable device, and is driven in the second mode otherwise.

3. The display device according to claim 1, wherein, in the first mode, the display driving unit is configured to supply, to the display unit, data adjusted by the first correction factor, and wherein, in the second mode, the display driving unit is configured to supply, to the display unit, data adjusted by the second correction factor.

4. The display device according to claim 1, wherein the display driving unit comprises a driving memory configured to receive and store the first correction factor or the second correction factor before the data is supplied to the display unit.

5. The display device according to claim 1, wherein the display driving unit comprises:

a first driving memory configured to receive and store the first correction factor in the first mode; and a second driving memory configured to receive and store the second correction factor in the second mode.

6. The display device according to claim 1, further comprising a driving memory located outside the display driving unit, and configured to receive and store the first correction factor or the second correction factor before the data is supplied to the display unit.

7. The display device according to claim 1, further comprising:

a first driving memory located outside the display driving unit and configured to receive and store the first correction factor in the first mode; and a second driving memory located outside the display driving unit and configured to receive and store the second correction factor in the second mode.

8. The display device according to claim 1, wherein, in the first mode, a first dithering scheme is used to generate the first correction factor, and, in the second mode, a second dithering scheme that is different from the first dithering scheme is used to generate the second correction factor.

9. The display device according to claim 1, wherein the first correction factor is for ensuring that pixels located in the first unit compensation area have substantially the same luminance, and wherein the second correction factor is for ensuring that pixels located in the second unit compensation area have substantially the same luminance.

10. The display device according to claim 1, wherein a driving frequency of the image displayed on the display unit in the first mode is greater than a driving frequency of the image displayed on the display unit in the second mode.

11. A method of driving a display device comprising a display unit, the method comprising:

determining whether the display device is in a first mode or in a second mode that is different from the first mode;

generating and storing a first correction factor for correcting data corresponding to an image displayed on the display unit based on a first unit compensation area when the display device is in the first mode;

generating and storing a second correction factor for correcting data corresponding to an image displayed on the display unit based on a second unit compensation area when the display device is in the second mode;

displaying, on the display unit, an image from which a stain has been removed using the first correction factor when the display device is in the first mode; and displaying, on the display unit, an image from which a stain has been removed using the second correction factor when the display device is in the second mode, wherein a size of the first unit compensation area is less than a size of the second unit compensation area.

12. The method according to claim 11, wherein the determining comprises:

determining that the display device is in the first mode when the display device is mounted to a wearable device; and determining that the display device is in the second mode otherwise.

13. The method according to claim 11, wherein a driving frequency of the image displayed on the display unit in the first mode is greater than a driving frequency of the image displayed on the display unit in the second mode.

14. The method according to claim 11, wherein the first correction factor is generated with reference to a luminance of an area of the first unit compensation area other than a stain area in the first unit compensation area, and wherein the second correction factor is generated with reference to a luminance of an area of the second unit compensation area other than a stain area in the second unit compensation area.

15. The method according to claim 11, wherein the first correction factor is generated with reference to an average value of luminances of first sampling points located on corners of the first unit compensation area, and wherein the second correction factor is generated with reference to an average value of luminances of second sampling points located on corners of the second unit compensation area.

* * * * *